United States Patent [19]

Turner

[11] Patent Number: 4,825,815

[45] Date of Patent: May 2, 1989

[54] PIVOTAL COOLING UNIT

[75] Inventor: Alec F. Turner, Southfield, Mich.

[73] Assignee: Deere & Company, Moline, Ill.

[21] Appl. No.: 149,791

[22] Filed: Jan. 29, 1988

[51] Int. Cl.[4] .............................................. F01P 5/06
[52] U.S. Cl. ..................................... 123/41.49; 165/77; 165/86; 180/68.4
[58] Field of Search ............... 123/41.49, 41.7, 198 E; 165/77, 86; 180/68.4, 69.22; 181/204

[56] References Cited

U.S. PATENT DOCUMENTS

| | | | |
|---|---|---|---|
| 2,100,490 | 11/1937 | Rippingille | 180/68.4 X |
| 2,122,454 | 7/1938 | Child | 165/77 |
| 2,250,795 | 7/1941 | Fitz Gerald et al. | 123/41.49 X |
| 2,912,057 | 11/1959 | Wagner | 180/68.4 |
| 3,834,478 | 9/1974 | Alexander et al. | 165/77 X |
| 4,120,271 | 10/1978 | Edmaier | 123/41.49 |
| 4,287,961 | 9/1981 | Steiger | 180/68.4 |
| 4,372,409 | 2/1983 | Mazur | 123/41.49 X |
| 4,488,518 | 12/1984 | Wohlfarth | 123/41.49 |
| 4,505,348 | 3/1985 | Gadefelt et al. | 180/68.4 X |
| 4,535,862 | 8/1985 | LeBlanc | 123/41.7 X |
| 4,542,785 | 9/1985 | Bagnall et al. | 165/95 |
| 4,579,090 | 4/1986 | Konrath et al. | 180/68.4 X |
| 4,598,785 | 7/1986 | LeBlanc | 123/41.7 X |
| 4,658,598 | 4/1987 | Schulz | 165/41 X |
| 4,696,361 | 9/1987 | Clark et al. | 180/68.4 |
| 4,757,858 | 7/1988 | Miller et al. | 123/41.49 X |

FOREIGN PATENT DOCUMENTS 24065 10/1955 Fed. Rep. of Germany ..... 180/68.4

OTHER PUBLICATIONS

U.S. Newsletter "U.S. Amphibious Assault Vehicle", July 1970.

Primary Examiner—Tony M. Argenbright
Assistant Examiner—Eric R. Carlberg

[57] ABSTRACT

A cooling system is provided with fans and radiators mounted in a single pivotal housing. This allows movement of the entire cooling unit away from the engine to allow access thereto, while still allowing the cooling unit to be operatively connected to the engine. Preferably, the fans and radiators are mounted in the housing laterally adjacent to one another to allow mounting above the engine in a minimum of vertical space. The housing then forms a chamber interconnecting the radiators and fans. One or more axial flow fans may be used, or a transverse flow fan can be used.

13 Claims, 5 Drawing Sheets

PIVOTAL COOLING UNIT

BACKGROUND OF THE INVENTION

1. Field of the Invention

The present invention relates to cooling systems, and particularly to cooling systems for amphibious vehicles and the like where cooling air must be drawn in and ejected from the same side of the vehicle.

2. Description of the Related Art

Conventional vehicular cooling systems have a radiator and a fan placed in front of the vehicle, with air being drawn through the radiator by the fan and ejected to the rear of the fan. In some situations, e.g., with boats and amphibious vehicles, this technique will not work. Air is available only above the vehicle and can be ejected easily only above the vehicle. Similarly, in some military applications, the threat of enemy weapons requires armor shielding on all sides of the vehicle, so that air may only be drawn in and ejected through the top of the vehicle. The cooling systems for such vehicles therefore must be designed to draw in and eject cooling air through the top of the vehicle.

In addition, in various military conditions due to various vehicle design parameters, the only possible position for the cooling system is immediately above the engine and/or transmission.

The Marine Corps' LVTPX12 Amphibious Assault Vehicle has such a cooling system. In that vehicle, the engine, radiator, cooling fan and transmission are assembled as a single unit for installation in the vehicle. Unfortunately, whenever maintenance or repair procedures are required, the entire power plant, cooling fan, and radiator must be removed from the vehicle, since the fan and radiator obstruct access to the engine. While this is annoying and time-consuming in a maintenance shop, in a battlefield situation, it is impossible. The only alternative is to dismantle the radiator and cooling fan to gain access to the engine. It then becomes necessary to recharge the cooling system, which is difficult or impossible under battlefield conditions. In addition, many engines problems cannot be detected or corrected without the cooling system intact so that the engine can run.

SUMMARY OF THE INVENTION

Accordingly, it is the purpose of the present invention to provide a cooling system capable of drawing in and ejecting air at the top of a vehicle, which is normally positioned above the engine of the vehicle, and which can be moved away from the top of the engine while still operatively connected to the engine.

This purpose is accomplished according to the present invention by mounting the fans and radiators for the cooling system in a pivotally mounted housing. The drive to the fans preferably enters the housing at the pivot point, so that power can be supplied to the fans without interruption. Hydraulic connections to the radiators are flexible to allow pivoting.

Preferably, the fan and radiators are placed laterally adjacent to one another, with a housing forming a chamber interconnecting them. This minimizes the thickness of the overall cooling system housing, which aids in meeting tight space requirements in many military applications. With this construction, adequate suction and minimal size are most easily obtained by using two adjacent axial flow fans, rather than a single large fan. Alternatively, a transverse flow fan can be used.

The radiator package normally is comprised of several flat radiators, preferably with a ballistic grille on the top thereof for military applications. Proper directioning of the ballistic grill can aid in separating the input and output air flows.

DETAILED DESCRIPTION OF THE PREFERRED EMBODIMENTS

Figure 1:
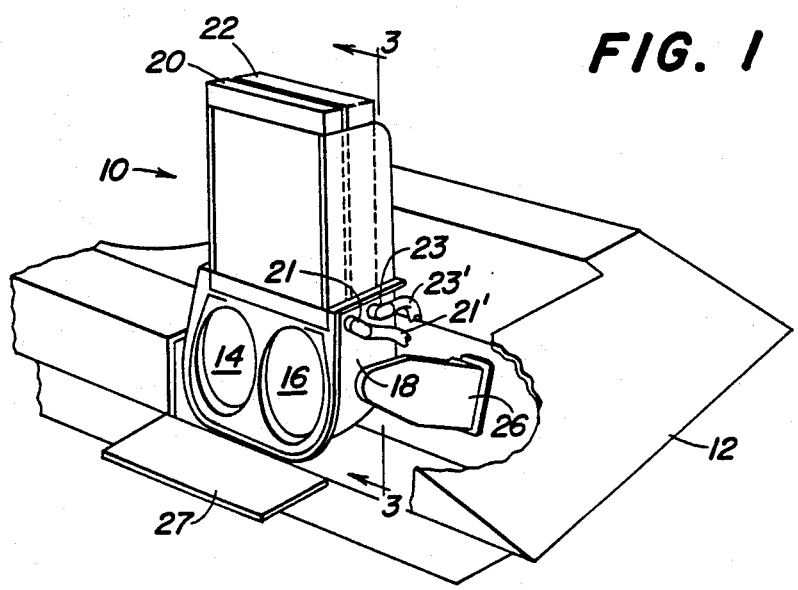
FIG. 1 is a perspective view of the cooling system according to the present invention pivoted into its raised position.
Figure 2:
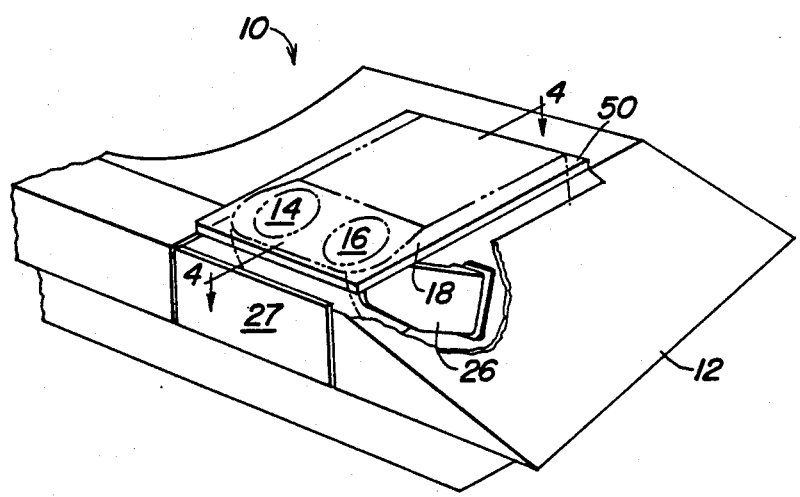
FIG. 2 is a perspective view of the cooling system of FIG. 1 pivoted into its lowered position.

Referring to FIGS. 1 and 2, a cooling unit 10 according to the present invention is depicted in a vehicle body 12. The cooling unit 10 has two axial flow fans 14, 16 mounted side-by-side in a housing 18. Radiators 20, 22 are mounted in the housing 18 laterally adjacent to the fans 14, 16. Hydraulic connections 21, 23 to the radiators 20, 22 are illustrated in FIG. 1, but the hydraulic hoses 21', 23' which complete the connection to the engine are only partially shown and are omitted from the remaining figures for clarity. Any conventional flexible hydraulic hose will suffice, provided that a sufficient loop of material is provided to allow pivoting of the housing between the raised position as shown in FIG. 1, and the lowered position shown in FIG. 2. A pivotal or removable flap 27 in the side of the vehicle 12 preferably is provided to allow space for pivoting of the cooling unit 10 between its raised and lowered positions. A drive mechanism 26 provides power to the fans 14, 16.

Figure 3:
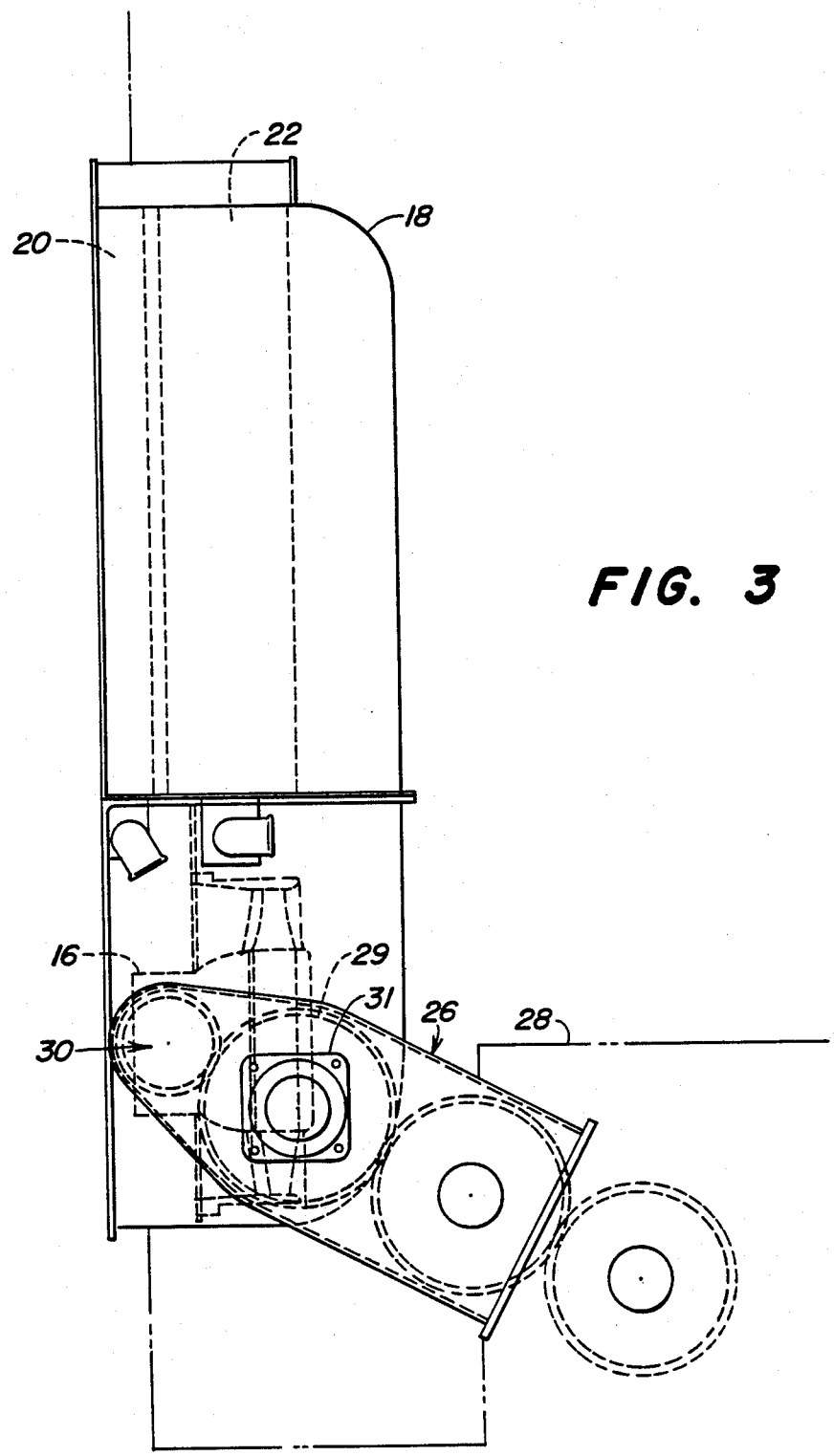
FIG. 3 is a side view along lines 3—3 in FIG. 1.

Referring to FIG. 3, the drive mechanism 26 preferably comprises a gear train connecting an engine 28 with a final drive 30 to the fans 14, 16. Other alternatives, e.g., a belt drive could be used. One or more of the gears in the gear train, e.g., intermediate gear 29, also can be used to drive auxiliary equipment, e.g., a hydraulic pump or electric generator which could be mounted to bracket 31.

Figure 4:
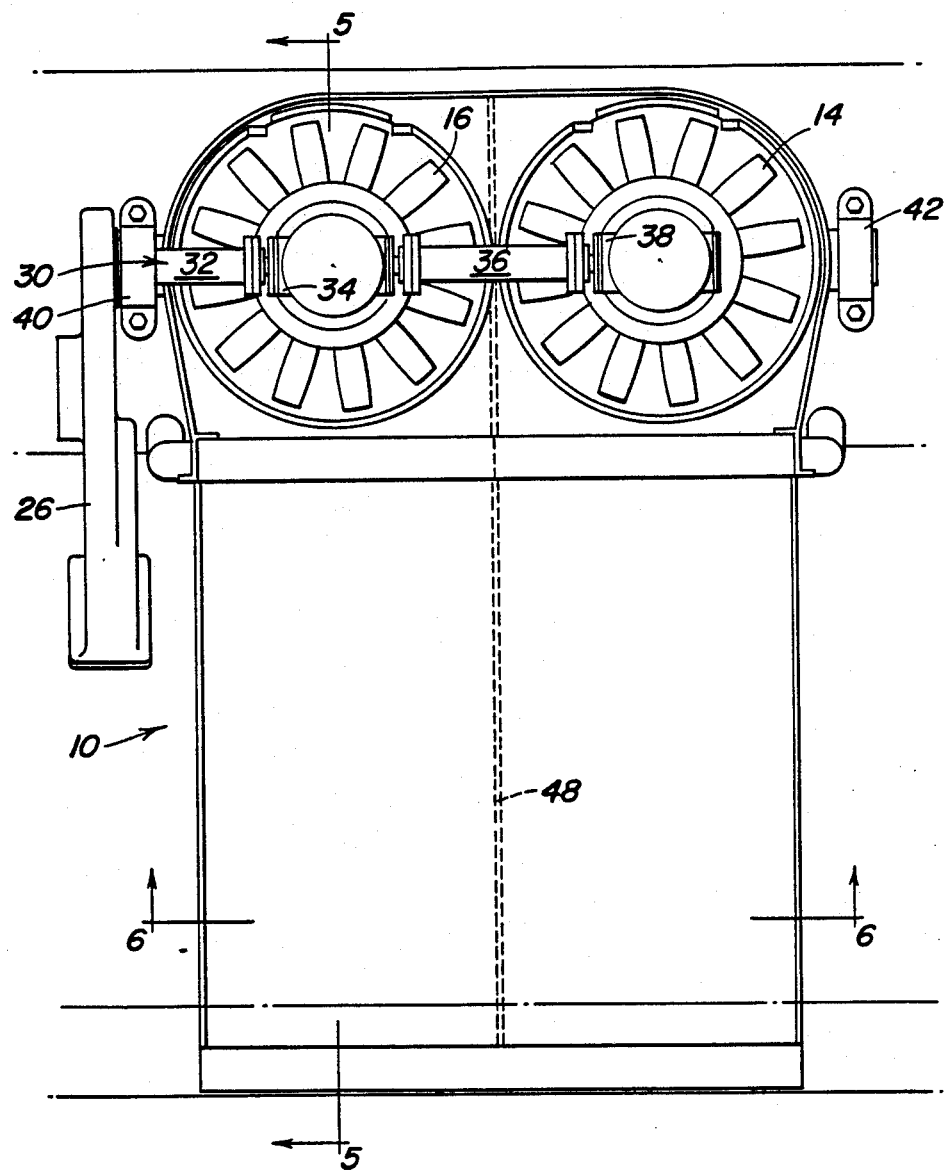
FIG. 4 is a top view along lines 4—4 in FIG. 2

Continuing to FIG. 4, the final drive 30 is conveniently formed by a drive shaft 32 to the first fan 16, which is driven by suitable gearing 34. Gearing 34 also conveys power to a secondary drive shaft 36 to power fan 14 by suitable gearing 38. The cooling unit 10 preferably is pivotally mounted by trunion bearings 40, 42, and the final drive 30 preferably is coaxial with the pivot axis of the cooling unit 10. In this manner, drive to the fans 14, 16 is unaffected by the rotation of the cooling unit 10 about its rotational axis.

Figure 5:
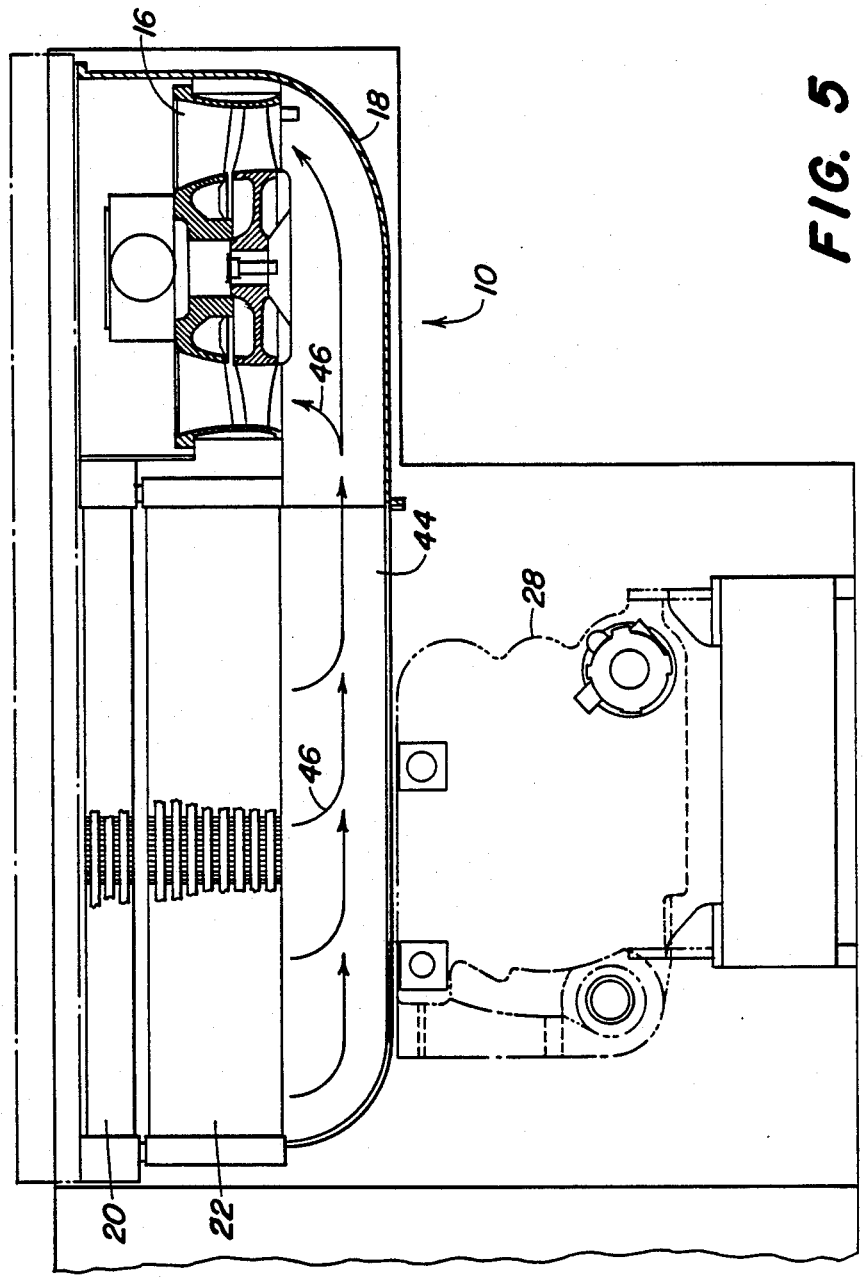
FIG. 5 is a cross-sectional view along lines 5—5 in FIG. 4.

Referring to FIG. 5, housing 18 forms a chamber 44 connecting the backs of radiators 20, 22 and fans 14, 16. As illustrated by arrows 46, air is drawn in through the radiators 20, 22 along the chamber 44 and is ejected upwardly through the fans 14, 16. If desired, and as best seen in FIGS. 4 and 6, this flow may be channeled into two separate passages by a center wall 48, so that the air is drawn through the axial flow fans 14, 16 separately.

Figure 6:
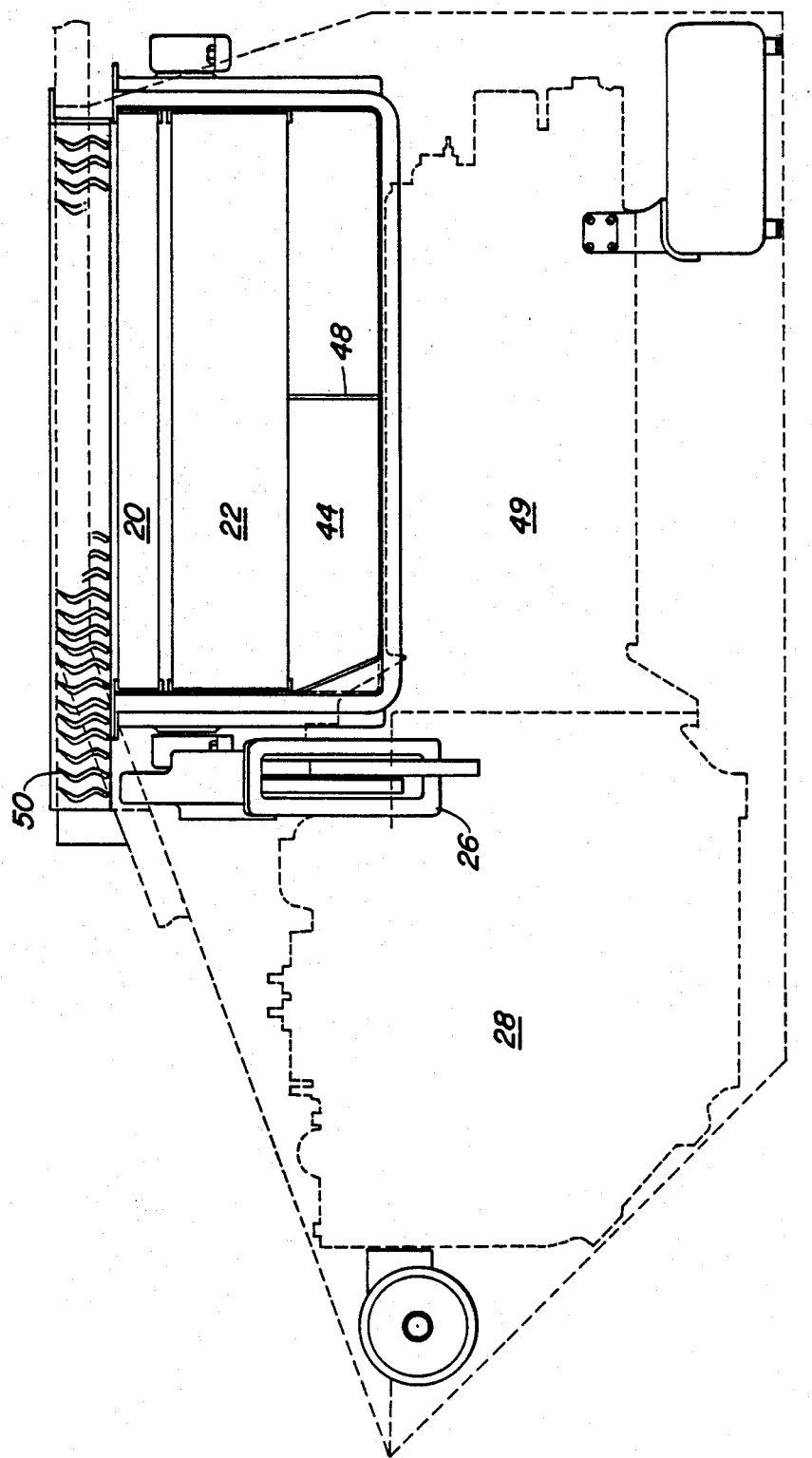
FIG. 6 is a cross-sectional view along lines 6—6 in FIG. 4, with a ballistic grille in place atop the cooling unit.

Continuing with FIGS. 2 and 6, if desired, e.g., in military applications, a ballistic grille 50 can be provided on top of the entire cooling unit 10. This grille preferably is removable to allow access to the cooling unit components, and it may be entirely separate from the cooling unit 10. Alternatively, it may be part of the cooling unit, so that it pivots along with the cooling unit 10. Proper orientation of the bars of the ballistic grille can minimize the likelihood of recirculation of air between the fans 14, 16 and the radiators 20, 22.

The cooling unit 10 can be pivoted by any suitable means, e.g., a small hydraulic cylinder and hand pump, a hand cranked recirculating ballscrew strut, or even manually, assuming a torsion bar or other counter-balance system is provided. Preferably, the pivoting mechanism will not require engine or battery power since these may not be available. The cooling unit 10 also preferably is pivotal between a position generally above the engine 28 and/or the transmission 49 (see FIG. 6) of the vehicle 12 and a position generally laterally adjacent to the engine 28 and/or transmission 49, thereby allowing maximum access to those parts.

Various modifications to the present invention can easily be made by one of ordinary skill in the art. For example, a transverse flow fan could be substituted for the axial flow fans 14, 16 depicted in the drawings. Since transverse flow fans are driven directly at their axial ends, the gearing 34, 38 and supplemental drive shaft 36 could be eliminated in this embodiment, with the transverse flow fan being driven directly by the primary drive shaft 32. Similarly, more or fewer radiators could be provided, or radiators other than a simple flat radiator. It also would be possible to place the radiators and fans in line with one another, rather than adjacent to one another, though this would increase the overall thickness of the device. Accordingly, the scope of the present invention is intended to be limited only by the following claims.

I claim:

1. A cooling system comprising:
   a cooling system support;
   a housing pivotally mounted on said support;
   at least one fan member mounted in said housing;
   at least one heat exchange element mounted in said housing adjacent said fan member, said housing defining a chamber interconnecting said fan member and said heat exchange element; and
   a drive shaft for providing power to said fan member which is substantially co-axial with the pivot axis of said housing.

2. The cooling system of claim 1, wherein said heat exchange element is laterally adjacent to said fan member.

3. The cooling system of claim 2, wherein said housing is pivotally mounted at a portion thereof surrounding said fan member.

4. The cooling system of claim 1, wherein said cooling system is for a vehicle engine having a transmission, said housing is pivotal between a substantially horizontal first position disposed generally above at least one of said engine and said transmission, and a substantially vertical second position disposed generally to the side of at least one of said engine and said transmission.

5. The cooling system of claim 4, wherein said system is operable in either of said first and second positions.

6. The cooling system of claim 1, wherein said at least one fan member comprises two side-by-side axial flow fans.

7. A cooling system for a vehicle engine, comprising:
   a cooling system support;
   a housing pivotally mounted on said support and pivotal between a first substantially horizontal position generally above said engine and a second substantially vertical position generally to the side of said engine;
   at least one fan member mounted in said housing;
   drive means for conveying driving force from said engine to said fan member, at least a portion of said drive means being coaxial with a pivot axis of said housing and operable to convey driving force to said fan member when said housing is in said first position, said second position, and any position therebetween;
   at least one heat exchange element mounted in said housing adjacent to said fan member, said housing defining a chamber interconnecting said fan member and said heat exchange element; and
   hose means for operatively connecting said heat exchange element to cool said engine when said housing is in said first position, said second position, and any position therebetween.

8. The cooling system of claim 7, wherein said heat exchange element is laterally adjacent to said fan member.

9. The cooling system of claim 7, wherein said hose means comprises at least one hose having a loop herein providing sufficient slack to allow said housing to pivot between said first and second positions while maintaining the connection between said heat exchange element and said engine.

10. The cooling system of claim 7, wherein said at least one fan member comprises first and second laterally adjacent axial flow fans.

11. The cooling system of claim 10, wherein said co-axial portion of said drive means comprises:
    a first drive shaft co-axial with said housing pivot axis and connected to be driven by said engine and to drive said first fan; and
    a second drive shaft connected to be driven by said first fan and to drive said second fan.

12. The cooling system of claim 7, further comprising a ballistic grille on a side of said housing away from said engine.

13. A cooling system for a vehicle engine, comprising:
    a cooling system support;
    a housing pivotally mounted on said support and pivotal between a first substantially horizontal position generally above said engine and a second substantially vertical position generally to the side of said engine;
    first and second laterally adjacent axial flow fans mounted in said housing;
    drive means for conveying driving force from said engine to said fans, at least a portion of said drive means being co-axial with a pivot axis of said housing and operable to convey driving force to said fans when said housing is in said first position, said second position, and any position therebetween;
    at least one heat exchange element mounted in said housing adjacent to said fans, said housing defining a chamber interconnecting said fans and said heat exchange element and further comprising a wall separating said chamber into first and second sections interconnecting said first and second fans, respectively, with said heat exchange element; and
    hose means for operatively connecting said heat exchange element to cool said engine when said housing is in said first position, said second position, and any position therebetween.

* * * * *